Feb. 20, 1923.

D. PALMER

MUD SHOE

Filed July 29, 1921

1,446,269

Inventor
D. Palmer,
By
Attorney

Patented Feb. 20, 1923.

1,446,269

UNITED STATES PATENT OFFICE.

DEVILLO PALMER, OF DETROIT, MICHIGAN.

MUD SHOE.

Application filed July 29, 1921. Serial No. 488,364.

*To all whom it may concern:*

Bt it known that DEVILLO PALMER, a citizen of the United States of America, residing at Detroit, in the city of Wayne and State of Michigan, has invented new and useful Improvements in Mud Shoes, of which the following is a specification.

The object of the invention is to provide a simple, inexpensive and efficient device which may be readily carried in the tool kit of an automobile or similar vehicle for use in facilitating the extraction of a drive wheel from a rut or mud hole in the road surface, when the normal tire surface is incapable of obtaining a sufficient tractive hold to advance the vehicle; and with these objects in view the invention consists in a construction and combination of parts of which a preferred embodiment is shown in the accompanying drawings, wherein.

Figure 1:
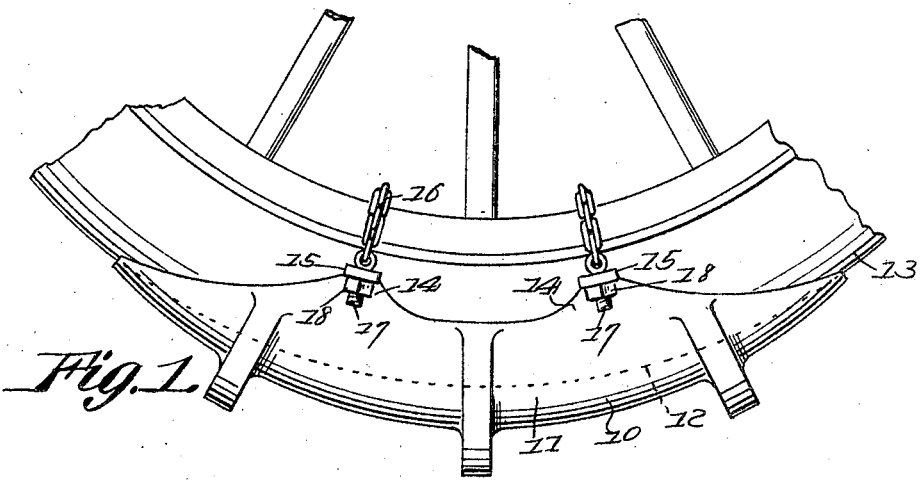
Figure 1 is a view of a mud shoe embodying the invention applied in the operative position to a vehicle wheel.
Figure 2:
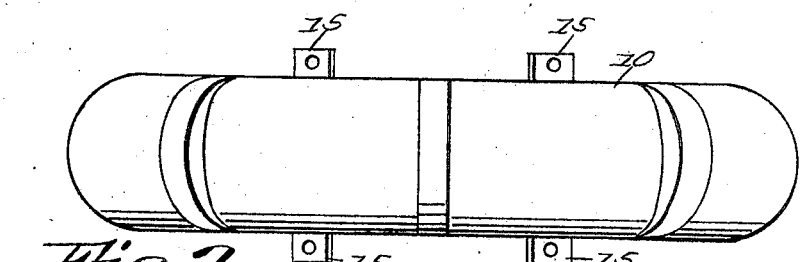
Figure 2 is an outer view of the same.
Figure 3:
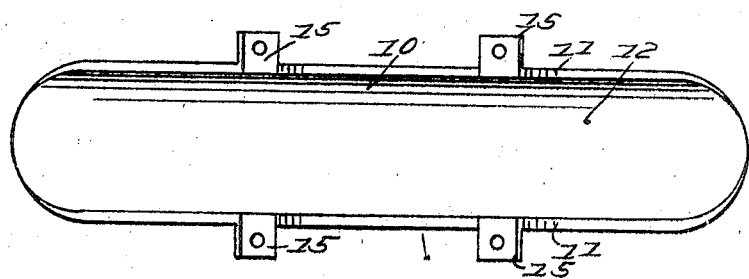
Figure 3 is an inner view thereof.

The shoe 10 is of crescent form having upstanding side wings 11 defining a seat 12 corresponding in contour with the periphery or tread surface of the tire 13 to which it is to be fitted and provided exteriorly with transverse lugs 14 preferably arranged in spaced relation as indicated, said wings being connected by suitable means for engagement with the wheel rim or felly and preferably in transversely spanning relation therewith.

In the construction illustrated the intermediate lug is made of a greater length than the terminal lug to extend more or less upward from the side surfaces of the shoe and the wings are provided with outwardly directed ears 15 with which are engaged the terminals of retaining chains 16 having pins 17 extending through perforations in said ears and engaged by nuts 18 so that an effective adjustment of the clamping or securing means may be provided to hold the shoe against sliding movement on the tire tread.

It is to be noted that the shoe 10 has its inner face formed longitudinally to the contour of the tire to which it is to be attached, while the outer face of the shoe conforms to the circumference of a circle which has a radius less than the radius of the wheel but disposed eccentrically of the latter. The shoe is thus thickened at an intermediate point in its length, the bottom wall gradually decreasing in thickness toward the extremity. Thus the intermediate lug projects farther from the center of the wheels than the end lugs and the shoe itself has its outer surface merging almost with the tread of the tire. This arrangement provides against jarring or shock to the wheel which might occur were the shoe so arranged that engagement with the mud or sand would not be gradual as in the construction herein shown.

Obviously the shoe may be applied to the wheel at any desired point as for example any upper or exposed portion thereof and thereupon when the engine is started or the clutch is thrown in and the wheel slides or skids in the mud hole, the shoe will be brought eventually into a position at the lower side of the wheel where the lugs will take hold of the road surface regardless of the loose or muddy condition thereof and will afford the tractive resistance necessary to enable the car to proceed.

It will be obvious moreover that the shoe being comparatively small may readily be carried in the car or even in the tool kit or box for emergency use to avoid the inconvenience and loss of time incident to applying a mud or non-skid chain.

Having described the invention, what is claimed as new and useful is:—

A mud shoe for the wheels of automobiles and similar vehicles consisting of a substantially crescent shaped member bounded laterally by inwardly directed wings, the inner face of said member conforming to the periphery of the tire to be engaged and the outer face following the circumference of a circle of less radius than that of the tire and struck from a center eccentric to the tire center thus providing a thickened portion at an intermediate point in the length of the shoe, the latter gradually decreasing in thickness toward its extremities, means for engaging the shoe with the tire, and outwardly projecting lugs carried by the shoe and disposed respectively adjacent the extremities and at an intermediate point thereof.

In testimony whereof I affix my signature.

DEVILLO PALMER.